United States Patent
Ciancanelli et al.

(10) Patent No.: US 7,497,719 B2
(45) Date of Patent: Mar. 3, 2009

(54) SNAP-LOCK CONNECTOR

(75) Inventors: Gino J. Ciancanelli, Southbury, CT (US); Betty Jean Zayas, Bridgeport, CT (US)

(73) Assignee: LightSources Inc., Orange, CT (US)

(*) Notice: Subject to any disclaimer, the term of this patent is extended or adjusted under 35 U.S.C. 154(b) by 0 days.

(21) Appl. No.: 11/860,988

(22) Filed: Sep. 25, 2007

(65) Prior Publication Data

US 2008/0076281 A1    Mar. 27, 2008

Related U.S. Application Data

(60) Provisional application No. 60/846,980, filed on Sep. 25, 2006.

(51) Int. Cl.
*H01R 13/627* (2006.01)
(52) U.S. Cl. ....................................... 439/356
(58) Field of Classification Search ................. 439/356, 439/353, 357, 358, 232
See application file for complete search history.

(56) References Cited

U.S. PATENT DOCUMENTS

| | | | |
|---|---|---|---|
| 2,227,739 A | 1/1941 | Pollard | |
| 2,836,646 A | 5/1958 | Paolinelli | |
| 3,601,699 A | 8/1971 | Norton, Jr., et al. | |
| 3,638,170 A | 1/1972 | Clement et al. | |
| 4,623,823 A | 11/1986 | Engel | |
| 4,700,101 A | 10/1987 | Ellner et al. | |
| 4,713,019 A | 12/1987 | Gaynor | |
| 4,906,891 A | 3/1990 | Takagi et al. | |
| 4,949,007 A | 8/1990 | Takagi et al. | |
| 5,166,527 A | 11/1992 | Solymar | |
| 5,169,227 A | 12/1992 | Korte et al. | |
| 5,239,226 A | 8/1993 | Seredich et al. | |
| 5,422,487 A | 6/1995 | Sauska et al. | |
| 5,752,842 A * | 5/1998 | Friederichs et al. | 439/152 |
| 5,902,552 A | 5/1999 | Brickley | |
| 5,968,455 A | 10/1999 | Brickley | |
| 6,190,191 B1 | 2/2001 | Pasternak | |
| 6,268,607 B1 | 7/2001 | Marsh et al. | |
| 6,340,310 B2 * | 1/2002 | Henrici et al. | 439/346 |

(Continued)

FOREIGN PATENT DOCUMENTS

WO    01/030399    5/2001

(Continued)

OTHER PUBLICATIONS

Witham, et al. "Apparatus and Method for Keying lamp and Lamp Fixture," U.S. Appl. No. 60/440,908, filed Jan. 15, 2003. Specification having 11 pages, Figures having 3 sheets.

(Continued)

*Primary Examiner*—Phuong K Dinh
(74) *Attorney, Agent, or Firm*—Cantor Colburn LLP

(57) ABSTRACT

A safety lamp connector assembly for use with at least one of more lamps which may include: an end cap for the lamp and having end cap clips; an intermediate snap action socket body for receiving the end cap; a socket base comprising: resilient clip arms with clip section on their ends which snap clips to the end cap clips with the intermediate snap action socket body located between the end cap and the socket base.

6 Claims, 14 Drawing Sheets

U.S. PATENT DOCUMENTS

| | | |
|---|---|---|
| 6,500,387 B1 | 12/2002 | Bigelow |
| 6,634,902 B1 | 10/2003 | Pirovic |
| 6,746,134 B1 | 6/2004 | Guzorek |
| 6,797,966 B2 | 9/2004 | Summers et al. |
| 6,809,326 B2 | 10/2004 | Disabito et al. |
| 6,838,057 B2 | 1/2005 | Russell et al. |
| 6,884,103 B1 | 4/2005 | Kovacs |
| 7,137,728 B2 | 11/2006 | Witham et al. |
| 7,354,317 B2 | 4/2008 | Witham et al. |
| 2002/0104972 A1 | 8/2002 | Guzorek |
| 2003/0011308 A1 | 1/2003 | Crawford et al. |

FOREIGN PATENT DOCUMENTS

| | | |
|---|---|---|
| WO | WO2006136026 | 12/2006 |

OTHER PUBLICATIONS

International Search Report, Application No. PCT/US06/06087, Date Mailed Feb. 27, 2008.

International Search Report, Application No. PCT/US07/20661, Date Mailed Jul. 28, 2008.

* cited by examiner

FIG. 27
FIG. 28
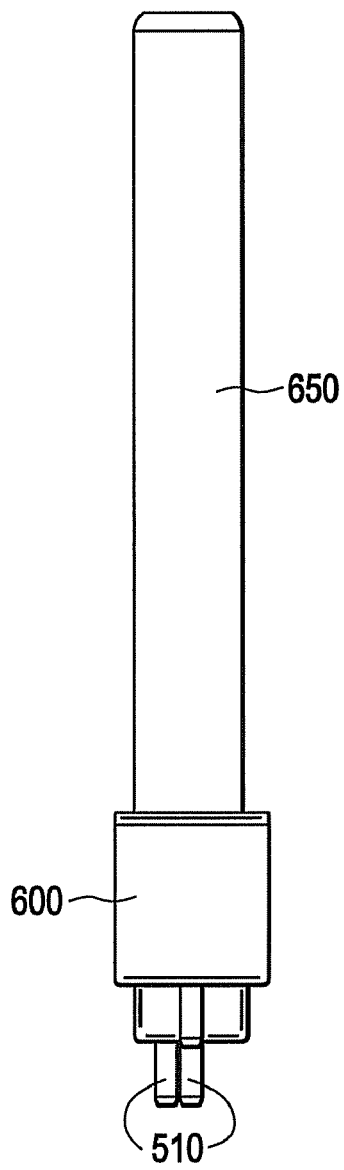
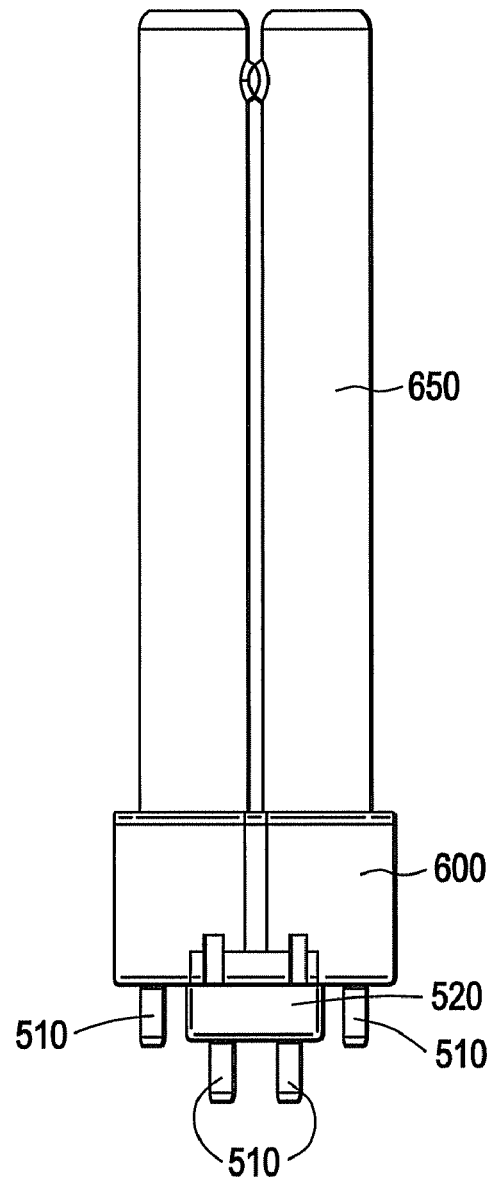
FIG. 29
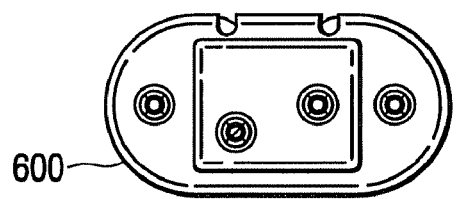

SNAP-LOCK CONNECTOR

This application claims priority to U.S. provisional application 60/846,980 filed Sep. 25, 2006, the entire disclosure of which is incorporated herein by reference.

BACKGROUND OF THE INVENTION

1. Field of the Invention

This invention generally relates to improvements in lamps, especially ultraviolet lamps used in air and water purifiers.

2. Background

Ultraviolet air or liquid purifiers are known for disinfecting contaminated air or water or other liquid for domestic or commercial use. Such purifiers include at least one lamp for emitting ultraviolet radiation into a chamber filled with contaminated air liquid to kill microorganisms therein. In a conventional manner, the lamp includes two electrodes spaced apart and located within an elongated arc tube containing a gas, particularly mercury vapor with or without additives. A pair of end caps is mounted at the ends of the tube. Each electrode contains two lead wires from the lamp seal each of which, or in some instances only one, are electrically connected to respective contact(s) or terminal pin(s). The lamp is typically inserted endwise into a sleeve installed in the water, other liquid or air purifier with or without the sleeve. To simplify insertion and electrical connection, the pins are conveniently mounted on one of the end caps. When the electrodes are energized by voltage from an electrical power supply, an electrical discharge is initiated in the gas between the electrodes. This discharge reacts with a layer of a radiation-emitting material coated on an interior surface of the arc tube and causes ultraviolet radiation to be emitted from the lamp in a manner well known in the art.

There are many different types of lamps that have a base or end cap that can be connected with a socket to provide electrical connections to the lamps. The end cap and socket must be constructed to permit replacement of the lamp while securely holding the lamp. This may be particularly important in certain applications where vibration or movement of the lamp or lamp fixture could result in unintentional separation between the lamp's end cap and the socket. Additionally, the electrical connections must remain secure.

In some applications where a multiplicity of contact pins and/or pin orientations is utilized, it is often difficult to align the contact pins to make the electrical connection necessary to operate the lamp. Often, the contact pins may become misaligned or bent due to their extension or projection from the base of the lamp, preventing their insertion into a socket. It may also be possible to insert the end cap into a socket such that the contacts are not connected with the proper terminals in the socket, resulting in improper operation of the lamp. Also, on a typical "slide into place" male/female pin connector there is no locking or twist locking and thus the pins may slide out and become disconnected easily by vibration for example.

An example of an ultraviolet lamp of the type described above is disclosed in U.S. Pat. No. 5,166,527 ('527), which uses a stepped base with a multi-pin connector, all of the contents of which are incorporated herein by reference and shows well known water and air purification arrangements using a lamp. The '527 patent discloses a lamp or bulb, used as an ultraviolet lamp for use in an air or water purifier, comprising an elongated, hollow arc tube extending along a longitudinal axis between opposite end regions. The tube contains a gas, preferably mercury vapor with or without additives. A pair of electrodes is spaced apart along the longitudinal axis. The electrodes are respectively mounted within the arc tube at the end regions thereof. A pair of end caps is respectively mounted at the end regions of the arc tube. A first electrical contact or pair of electrical contacts or terminal pins extends in mutual parallelism along the longitudinal axis and is electrically connected to one or both of the electrode lead wires. A second electrical contact or pair of electrical contacts or terminal pins extends in mutual parallelism along the longitudinal axis and is electrically connected to one or both of the other of the electrode lead wires. Both pairs of pins are mounted on, and extend outwardly along the longitudinal axis of, one of the end caps. A wire conductor is, or two wire conductors are, located exteriorly of the tube and electrically connected to one pin or one pair of pins at one end region of the tube, as well as to the electrode at the other end region of the tube. This design is mainly designed to prevent electrical arcing and does not lock in place.

As noted in WO/2006/136026 to Elku et al. which is a variation of the slide-on pin connector above, a potential problem with this approach is that in many applications, the radiation lamp is immersed in or near a flow of air or water and turbulence created within that water treatment system invariably imparts a vibratory motion to the lamps which frequently results in lamps being vibrated or shaken loose of its electrical connection base or socket thereby causing the lamps to be rendered completely or intermittently inoperative. When such an event occurs, the water being treated may not be fully disinfected. The prior art has attempted to address this problem by using a relatively complicated mechanical connection (e.g., a so-called "push-and-twist" connection) to secure the lamp to the connection base. See, for example, U.S. Pat. No. 5,422,487 to Sauska et al. and U.S. Pat. No. 6,884,103 to Kovacs. The potential problem with these approaches is the complexity of the mechanical connection between the lamp and the base unit requiring the use of springs, specialized connection lugs and the like. Further, a connection system which is predicated on a dual motion system such that pushing and twisting if used incorrectly for example may give rise to higher incidents of lamp breakage, electrical shock, and other damage to the lamp by field personal. Therefore, eliminating a forceful "push" necessary to deflect a heavy locking spring in a "push and twist" lock would be beneficial because the typically glass lamp would be subject to reduced force and stress.

Also, it is important for safety that lamps of proper wattage be used for safety, heat, and fire concerns, thus a unique keying system which only allows lamps of proper wattage to be inserted into the base will also help safety.

Accordingly, there remains the need in the art for a safety lamp device, particularly a radiation lamp, which will provide a reliable, locking, and secure from movement electric connection, yet be relatively inexpensive, uncomplicated, durable, rugged, and simple to implement with smooth operation and with reduced force and stress on the lamp for safety purposes. Also, a lamp that reduces the chance of electrical shock is needed for safety purposes.

Thus, there continues to be a need for improved lamp base designs, particularly ultraviolet lamps.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 27 is a side view of an end cap with lamps, in accordance with one embodiment of the invention.

FIG. 28 is a side view of an end cap with lamps, in accordance with one embodiment of the invention.

FIG. 29 is a view from the end cap pin end of an end cap, in accordance with one embodiment of the invention.

DETAILED DESCRIPTION OF THE INVENTION

As used herein, the word "terminal" can mean, but is not limited to, an active terminal or a passive "dummy" terminal. Additionally, the term "lamp" can refer to compact fluorescent lamps, or Ultra-Violet (UV) lamps, among other lamps suitable for the claimed apparatus.

The apparatus described herein is useful in air and water purification systems, among other applications.

Figure 1:
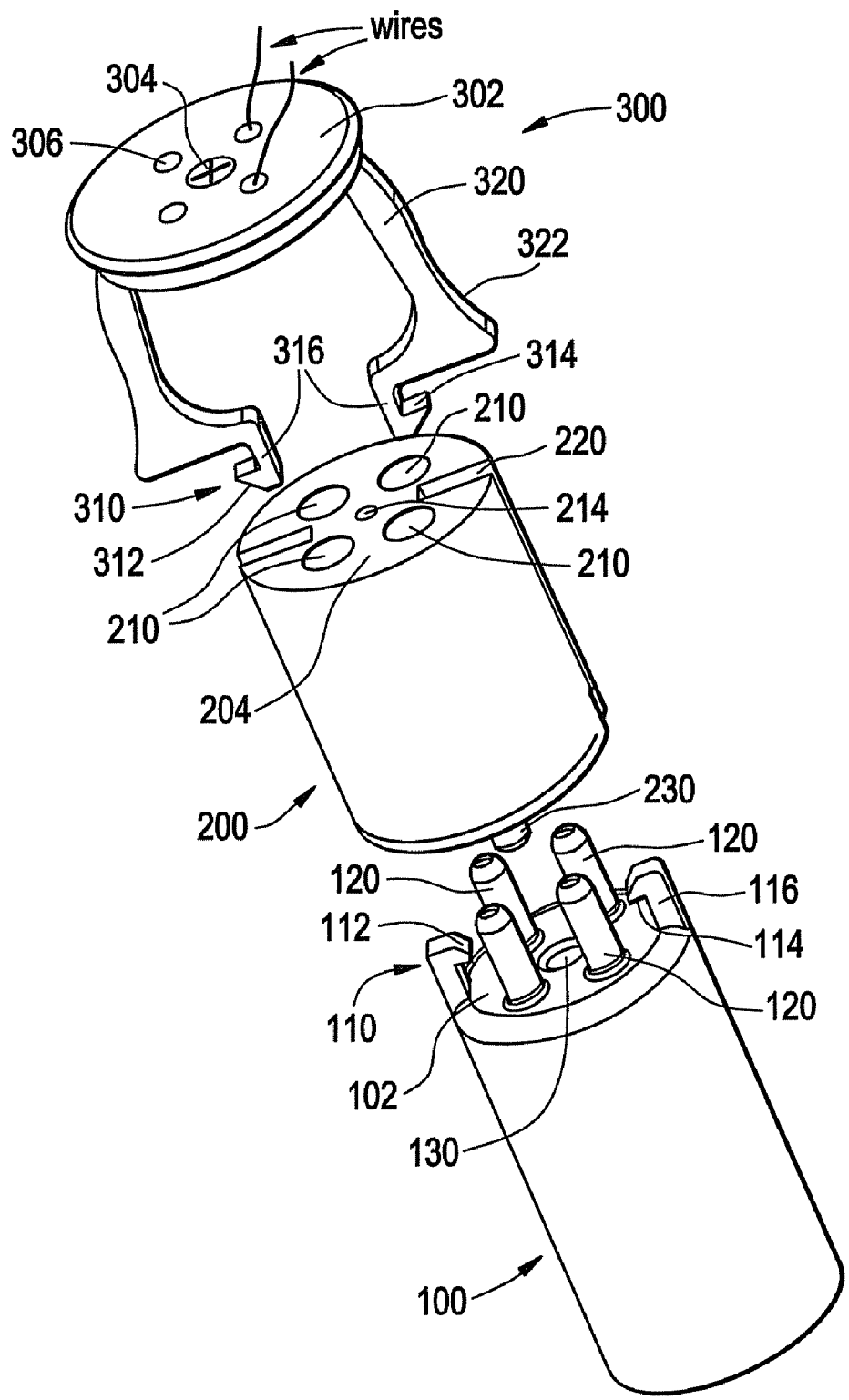
FIG. 1 is a perspective view of a disassembled end cap, socket body, and socket base in accordance with one embodiment of the invention.

FIG. 1 shows one possible embodiment of the claimed apparatus disassembled into its constituent parts. In this embodiment, the snap lock connector can include an end cap 100, a socket body 200, and a socket base 300.

Figure 2:
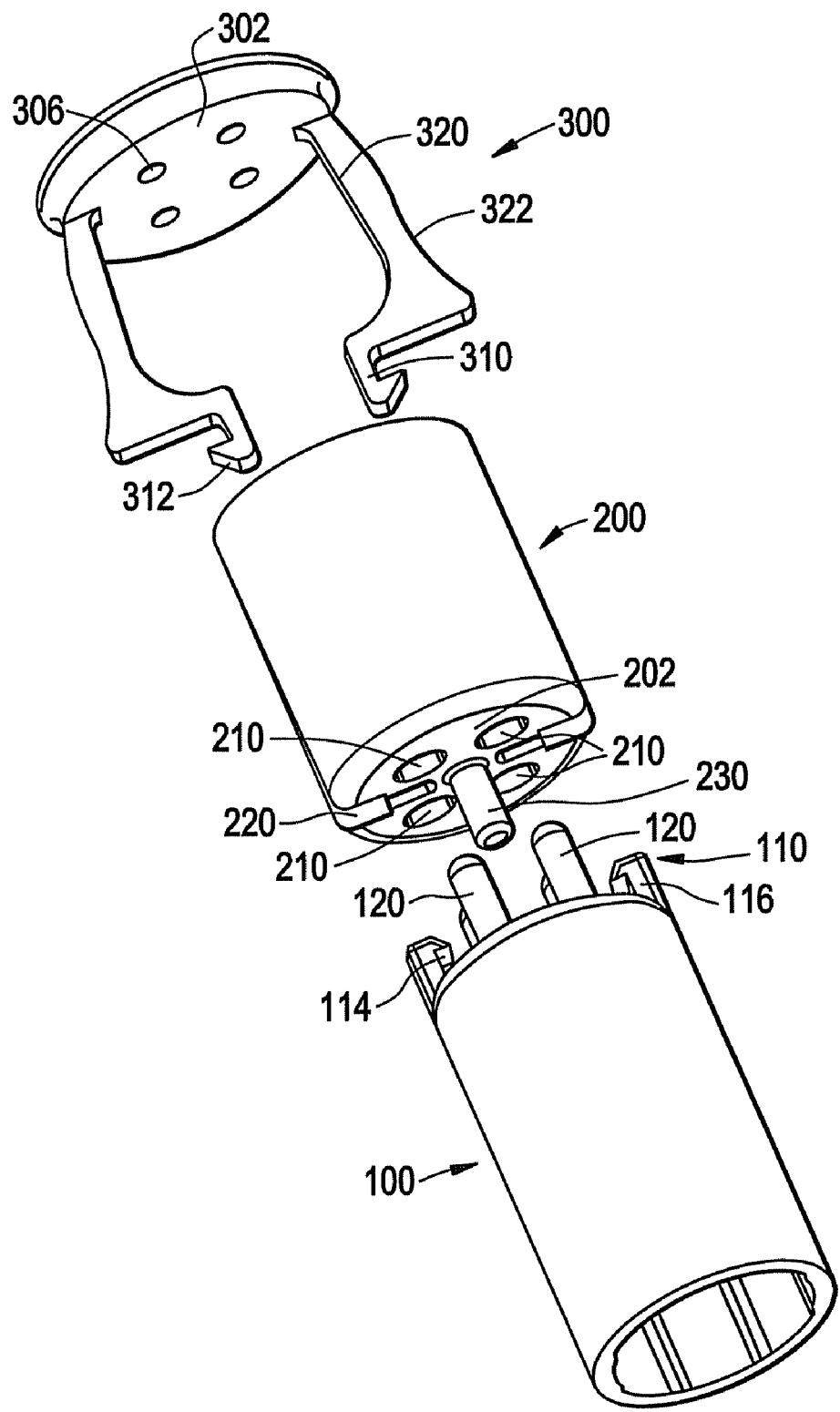
FIG. 2 is a perspective view of a disassembled end cap, socket body, and socket base in accordance with one embodiment of the invention.
Figure 3:
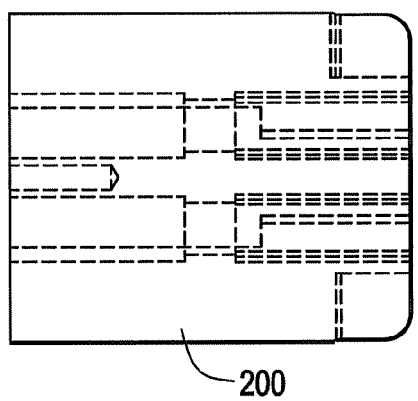
FIG. 3 is a side view of a socket body with broken lines showing interior structure, in accordance with one embodiment of the invention.
Figure 4:
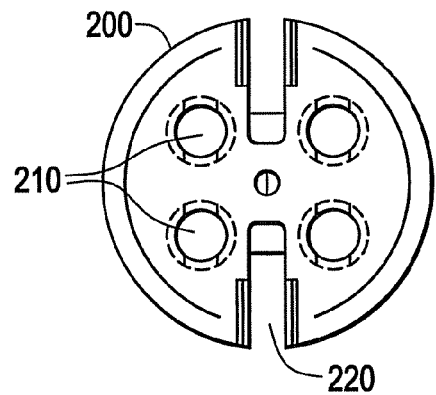
FIG. 4 is a top view of a socket body, in accordance with one embodiment of the invention.
Figure 5:
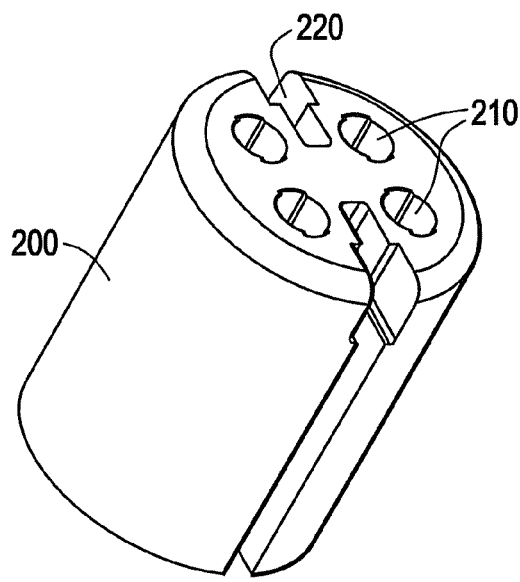
FIG. 5 is a perspective view of a socket body, in accordance with one embodiment of the invention.
Figure 10:
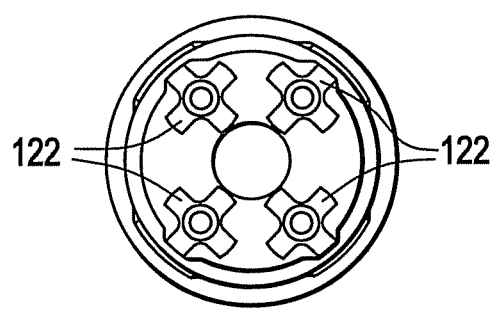
FIG. 10 is a view looking down into an end cap in accordance with one embodiment of the invention.

As seen in FIGS. 1-2, end cap 100 in this embodiment can have a hollow tubular body into which a lamp can be inserted. As seen in FIG. 10, end cap 100 can have a number of interior contacts 122. These contacts are electrically connected to end cap pins 120, shown in FIGS. 1 and 2. End cap pins 120 extend from closed end 102 of end cap 100 in a direction parallel to the longitudinal axis of end cap 100. End cap 100 can also have end cap hole 130 for receiving a socket pin 230, as described below.

Additionally, end cap 100 can have at least one end cap clip 110. In the particular embodiment illustrated in FIGS. 1 and 2, end cap 100 has two end cap clips 110 disposed opposite of each other on the outer circumference of closed end 102. However, one can easily conceive how either more or less than two clips can be used. Furthermore, the clips do not have to be located opposite each other or symmetrically disposed; one can easily conceive of alternatives in which the clips are asymmetrically disposed on closed end 102 of end cap 100.

End cap clips 110 comprise three main parts, the clip leg 116, a slanted pushing face 112, and a flat locking face 114. Clip legs 116 extend from the closed end 102 in a direction parallel to the longitudinal axis of the end cap 100. Flat locking face 114 extends perpendicular from clip leg 116. Slanted pushing face 112 extends from the end of flat locking face 114 to the terminal end of clip leg 116.

As seen in FIGS. 1 and 2, in this particular embodiment, socket body 200 is a generally cylindrical body. Socket body 200 has two ends, an insertion end 202 and a base end 204. Socket body 200 also has a number of socket channels 210 running through the entire length of a socket body 200. Socket channels 210 are lined with electrically conductive material or otherwise configured so that a pin or wire contacting one end of socket channel 210 will automatically be in electrical contact with the other end of socket channel 210.

End cap pins 120 can be inserted into socket channels 210 at the insertion end 202 of socket body 200. Because socket channels 210 are electrically conductive as described above, inserting end cap pins 120 into socket channels 210 will make end cap pins 120 electrically connected to the end of socket channels 210 opening on the base end 204 of socket body 200.

Socket body 200 may also include a socket pin 230. Socket pin 230 can insert into end cap hole 130 at the same time that end cap pins 120 are inserted into socket channels 210. Socket pin 230 can be used as a guide for proper insertion of end cap pins 120 into socket channels 210, or as a means of deterring the use of counterfeit, copied, or generic parts which may be unsafe. For example, authorized parts may be of the wrong or excessive wattage rating and/or manufactured poorly.

Socket body 200 can also include at least one clip slot 220. Clip slot 220 is a groove cut into the side of socket body 200 and extends from insertion end 202 to base end 204. Generally, the number of clip slots 220 will correspond to the number of end cap clips 110. Clips slots 220 are aligned with end cap clips 110.

As seen particularly in FIG. 1, socket body 200 can also include a screw hole 214. Screw hole 214 receives a screw that attaches socket base 300 to socket body 200, as described below.

As seen in FIGS. 1 and 2, in this particular embodiment, socket base 300 comprises two main parts, a socket base plate 302 and clip arms 320. Socket base 300 can be attached to base end 204 of socket body 200.

Socket base plate 302 can be round in shape and having a certain thickness dimension. A screw 304 can extend through socket base plate 302 for attaching the socket base 300 to the socket body 200. Socket base plate 302 also has a number of socket base holes 306 that align with socket channels 210 of socket body 200. As shown in FIG. 1, "wires" or other power source connections can be inserted through socket base holes 306, and then can be electrically connected to socket channels 210. Therefore, "wires" can be electrically connected to end cap pins 120 through socket channels 210.

Clip arms 320 are disposed along the outer circumference socket base plate 302 and extend generally perpendicular to socket base plate 302. Clip arms 320 are aligned with clips slots 220 when socket base 300 is attached to socket body 200. Clip arms 320 can include a pressure area 322 and a clip section 316. Clip arms 320 are flexible and resilient and flex inward toward a longitudinal axis of socket base 300 when pressure is applied to pressure areas 322.

Clip section 310 is similar in structure to end cap clips 110. Clip section 310 includes a clip leg 316, flat locking face 314, and slanted pushing face 312. Flat locking face extends perpendicular to clip legs 316. Slanted pushing face 312 extends from the end of flat locking face 314 to the terminal end of clip leg 316.

Figure 11:
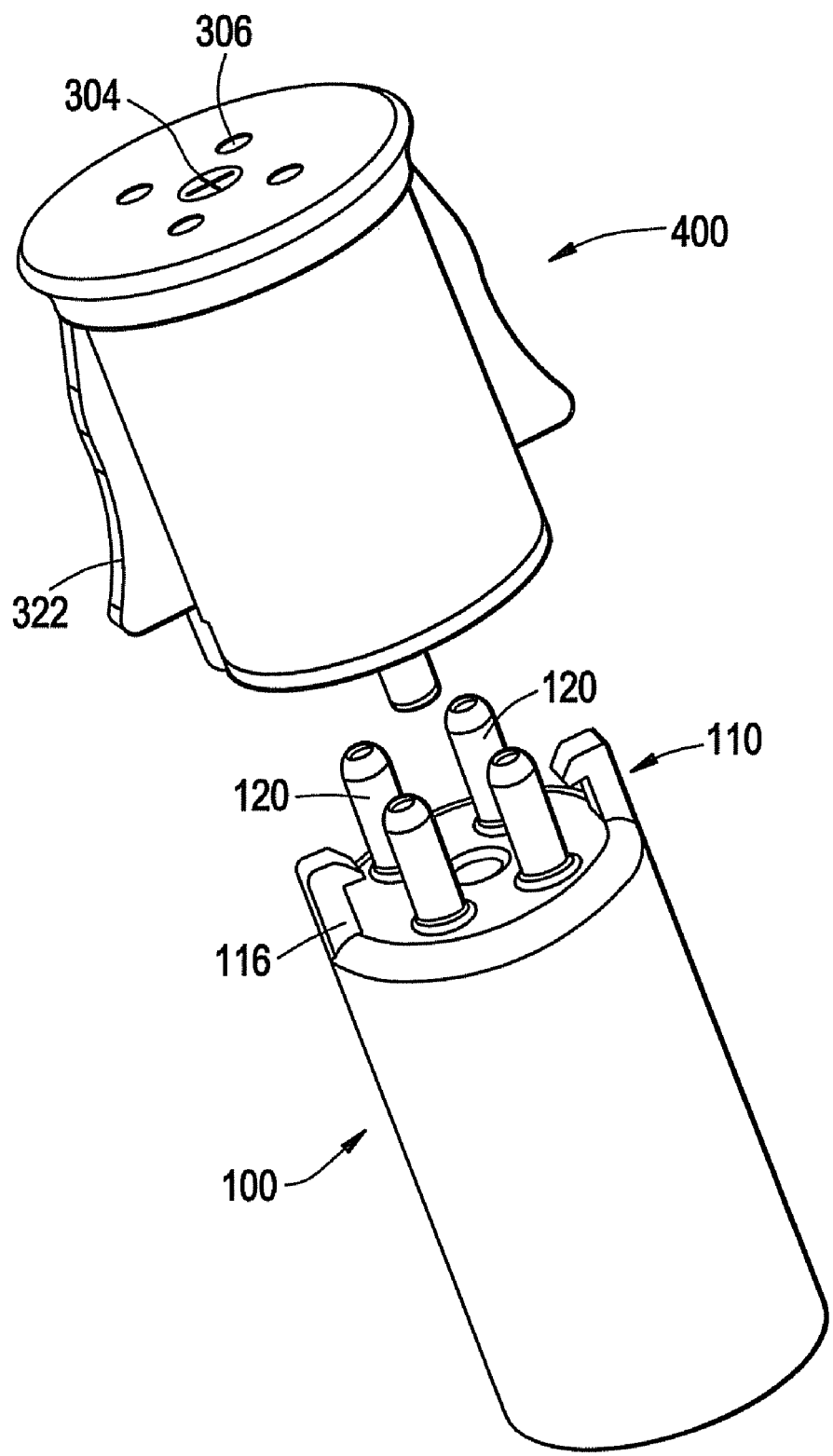
FIG. 11 is a perspective view of an end cap and an assembled socket assembly in accordance with one embodiment of the invention.
Figure 12:
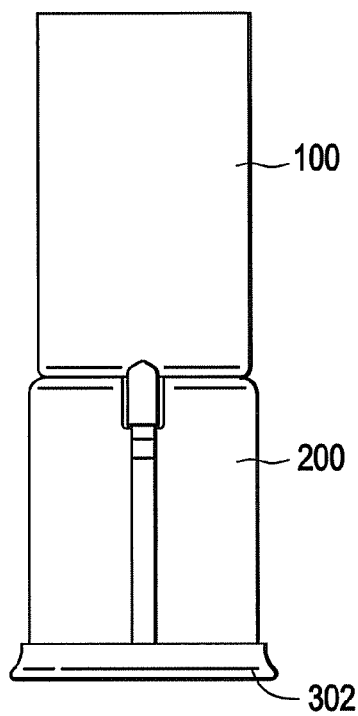
FIG. 12 is a side view of an end cap inserted and locked into an assembled socket assembly in accordance with one embodiment of the invention.
Figure 13:
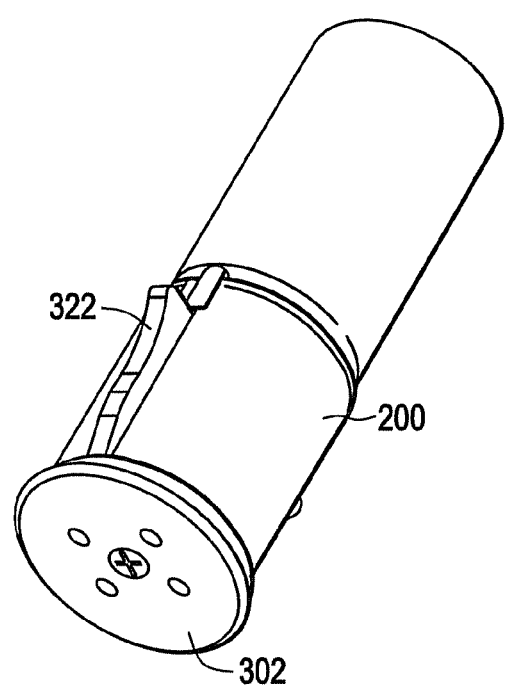
FIG. 13 is a perspective view of an end cap inserted and locked into an assembled socket assembly in accordance with one embodiment of the invention.
Figure 14:
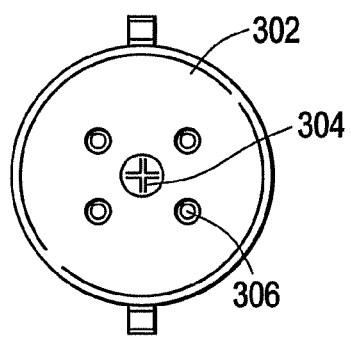
FIG. 14 is a view from the socket base plate end of an assembled socket assembly in accordance with one embodiment of the invention.
Figure 15:
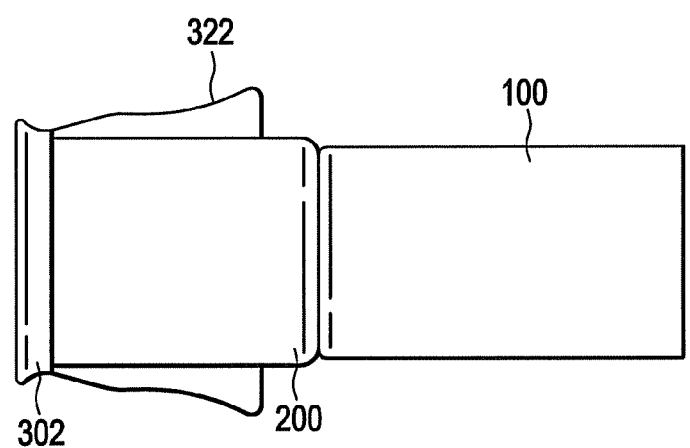
FIG. 15 is a side view of an assembled socket assembly showing a profile view of the clip arm pressure area, in accordance with one embodiment of the invention.
Figure 16:
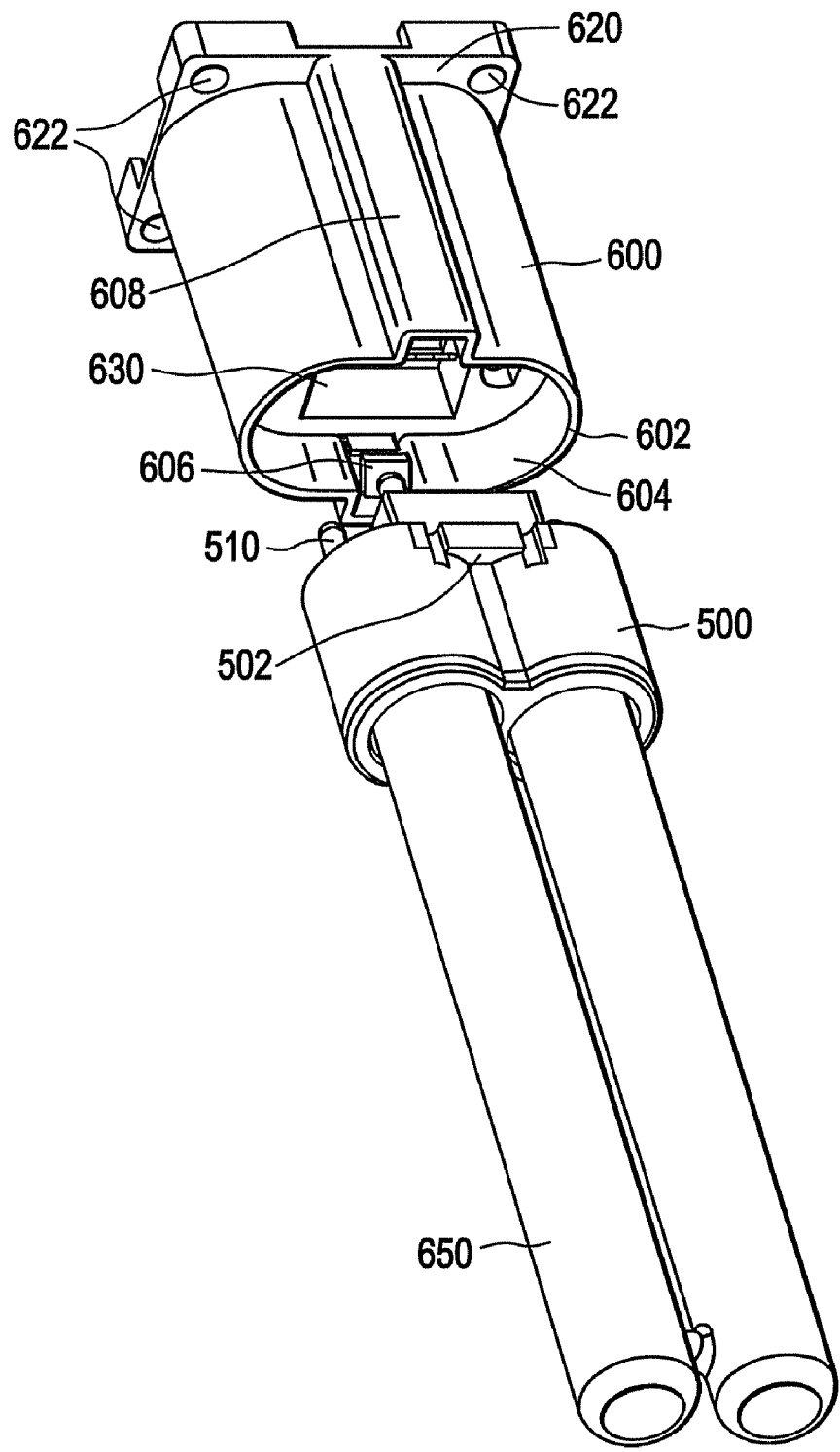
FIG. 16 is a perspective view of a disassembled end cap and socket housing in accordance with one embodiment of the invention.
Figure 17:
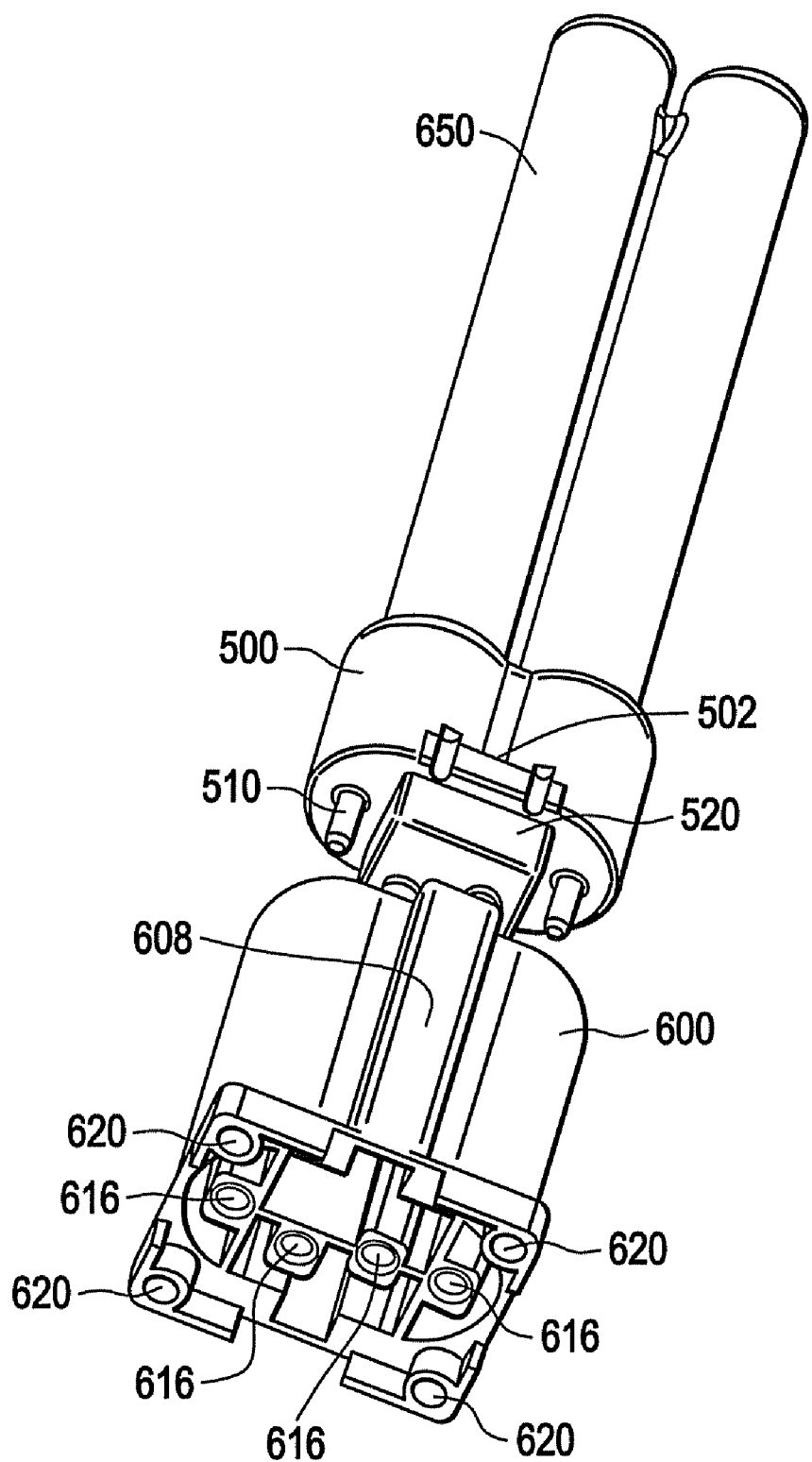
FIG. 17 is a perspective view of a disassembled end cap and socket housing in accordance with one embodiment of the invention.
Figure 18:
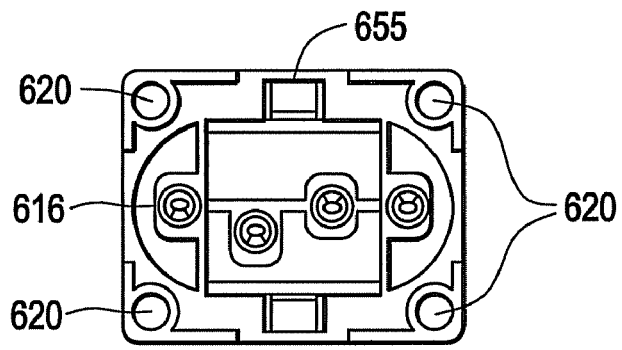
FIG. 18 is a view from the base end of a socket housing in accordance with one embodiment of the invention.
Figure 19:
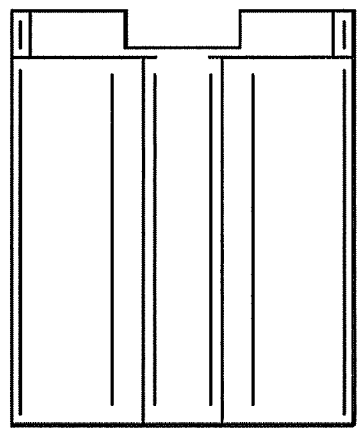
FIG. 19 is a side view of a socket housing in accordance with one embodiment of the invention.
Figure 20:
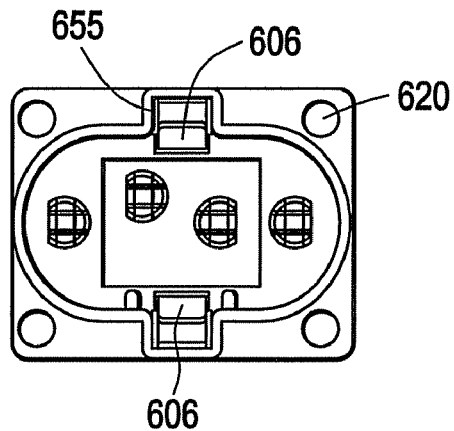
FIG. 20 is a view from the insertion end of a socket housing in accordance with one embodiment of the invention.
Figure 21:
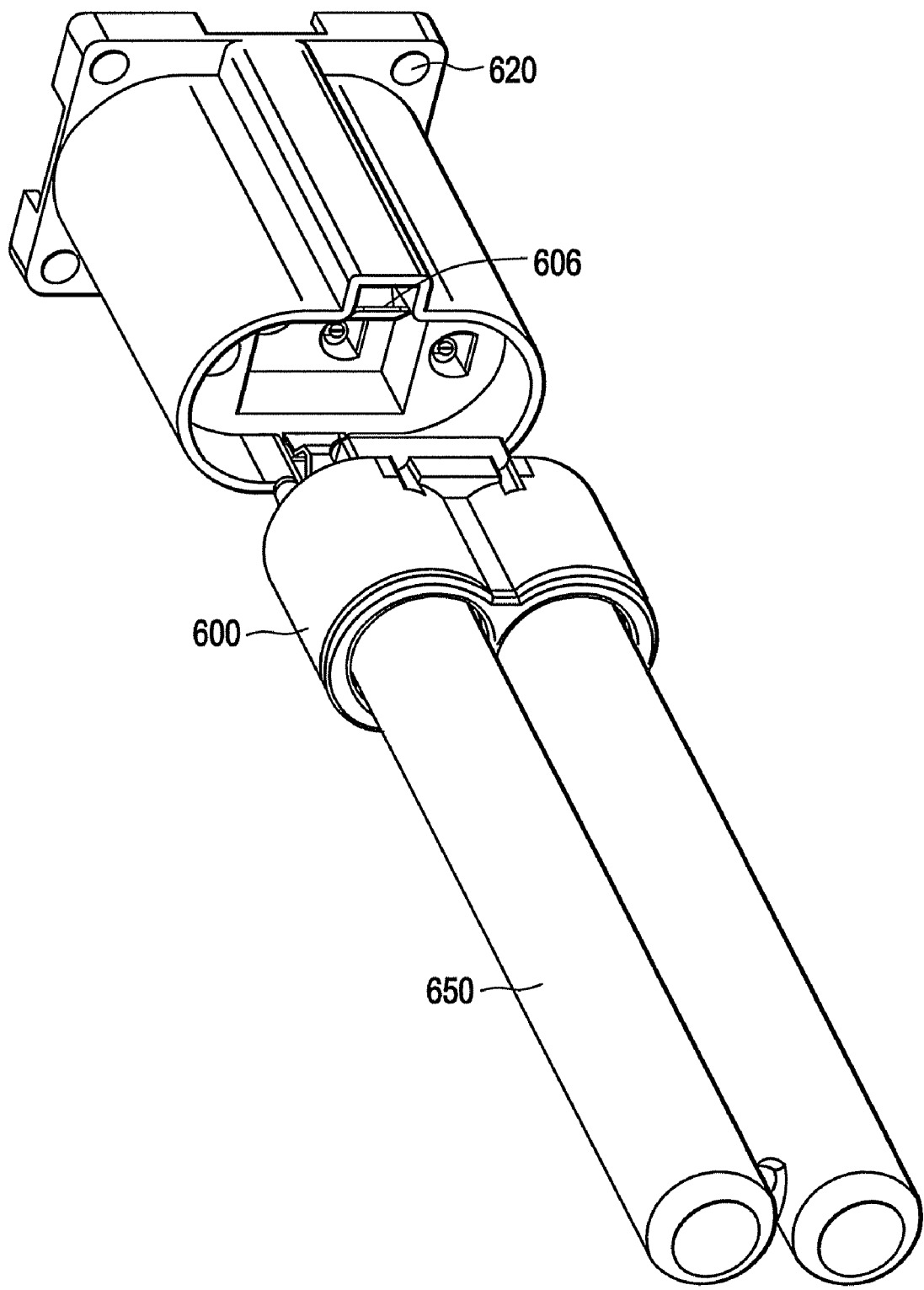
FIG. 21 is a perspective view of a disassembled end cap and socket housing in accordance with one embodiment of the invention.
Figure 22:
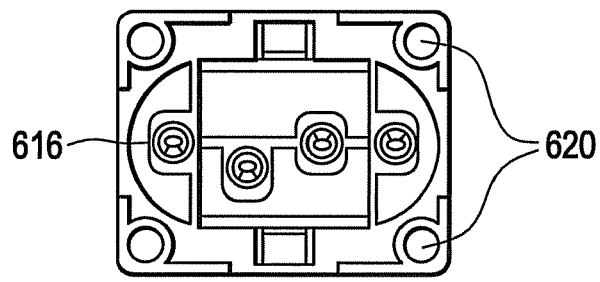
FIG. 22 is a view from the base end of a socket housing in accordance with one embodiment of the invention.
Figure 24:
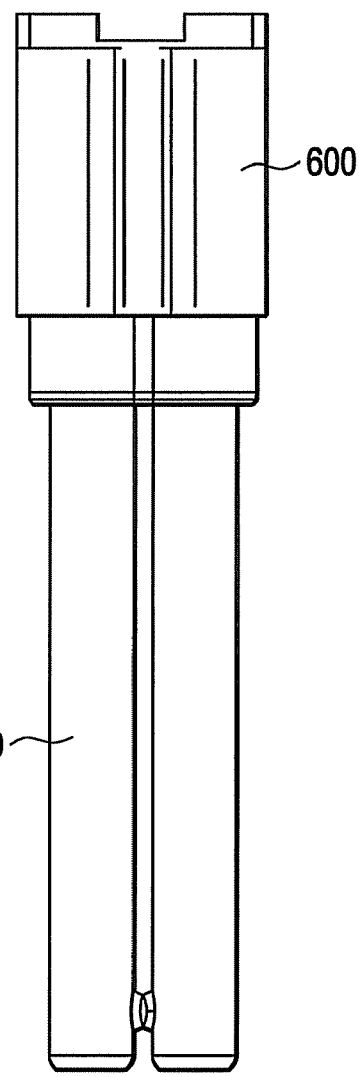
FIG. 24 is a side view of an assembled end cap and socket housing, shown with lamps, in accordance with one embodiment of the invention.
Figure 23:
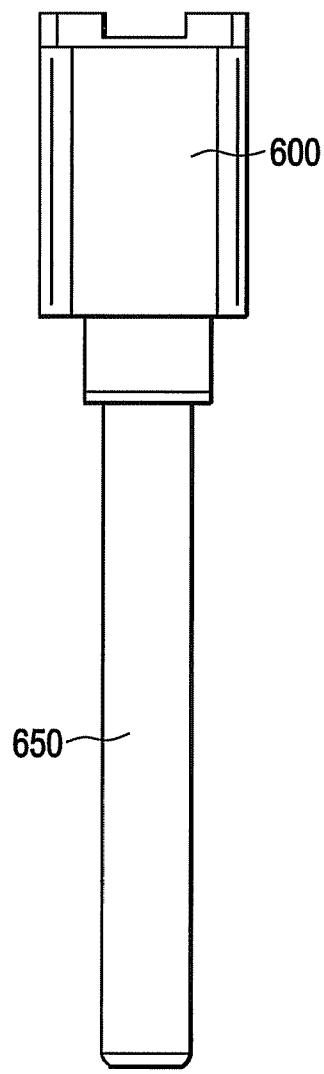
FIG. 23 is a side view of an assembled end cap and socket housing, shown with lamps, in accordance with one embodiment of the invention.
Figure 25:
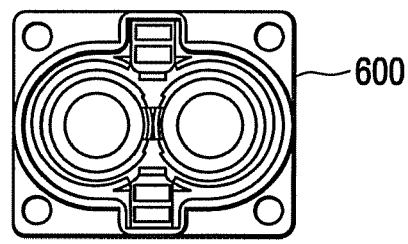
FIG. 25 is a view from the lamp end of an assembled end cap an socket housing with lamps, in accordance with one embodiment of the invention.
Figure 26:
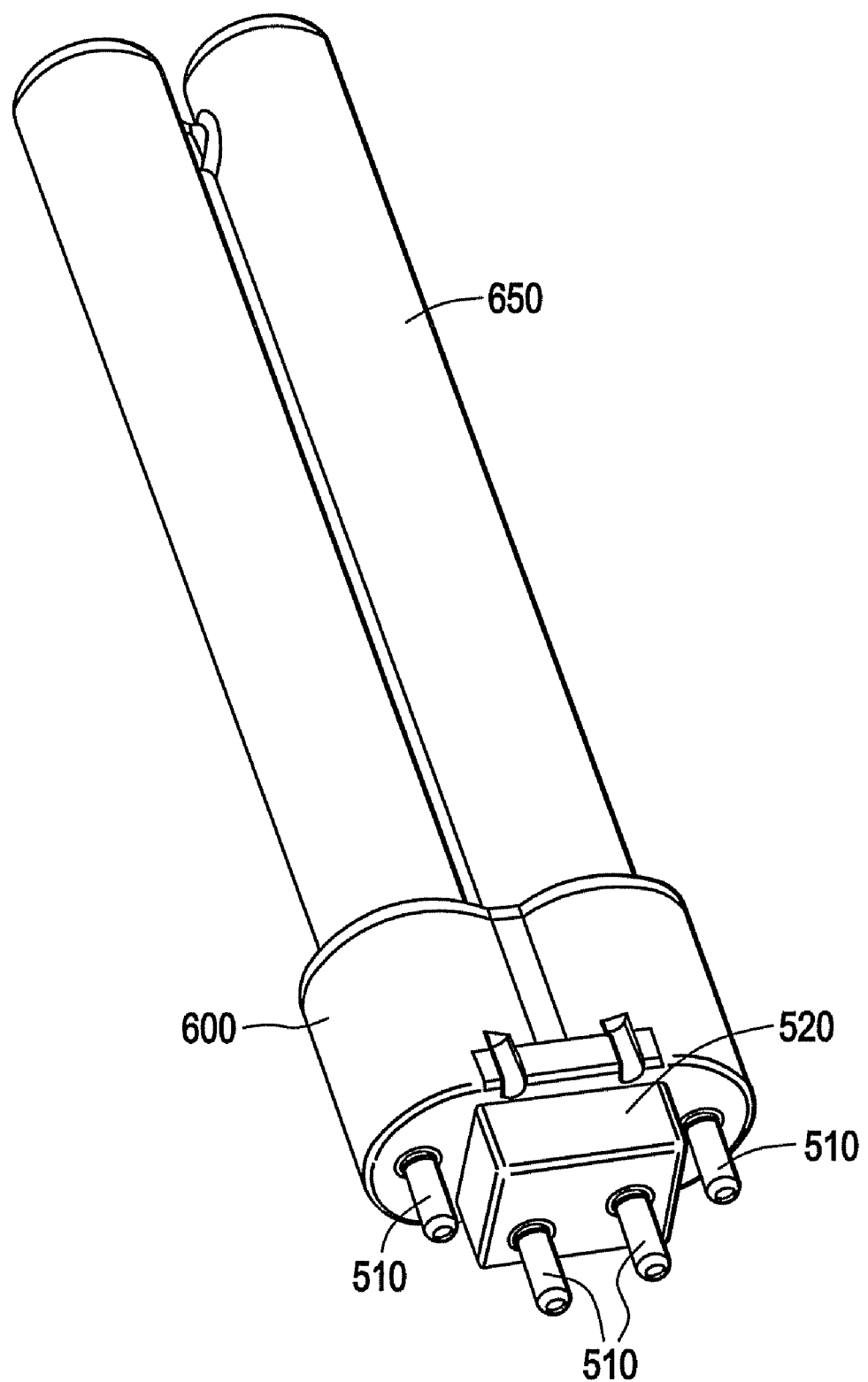
FIG. 26 is a perspective view of an end cap with lamps, in accordance with one embodiment of the invention.
Figure 30:
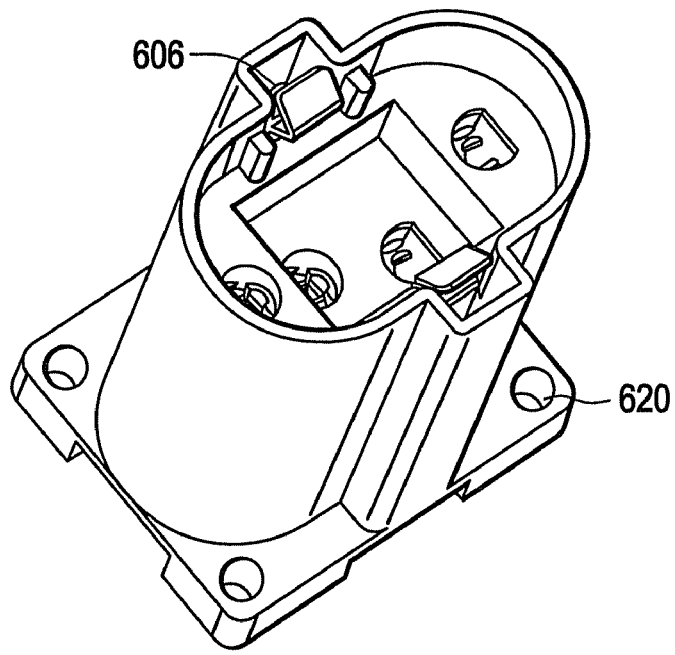
FIG. 30 is a perspective view of a socket housing, in accordance with one embodiment of the invention.
Figure 31:
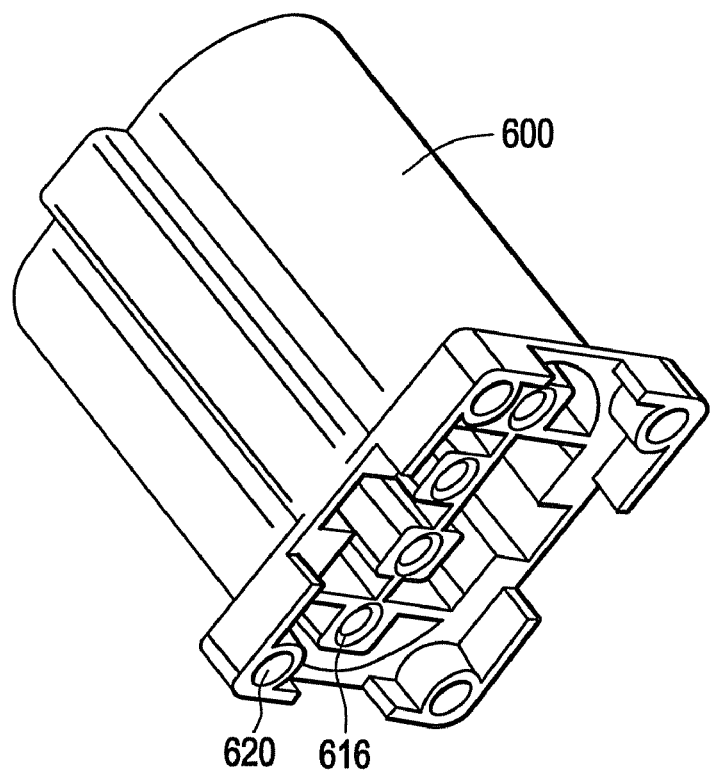
FIG. 31 is a perspective view of a socket housing, in accordance with one embodiment of the invention.

As noted above, socket base 300 can be attached to socket body 200, creating socket assembly 400 and attached with a screw, as seen in FIG. 11. When assembled as indicated in FIG. 11, socket clip sections 310 are hidden inside of clip slots 220. Pressure areas 322 remain outside the circumference of the socket body 200.

Now the insertion and locking of end cap 100 into socket assembly 400 will be described as shown in FIG. 11. As described above, end cap pins 120 can be inserted into socket channels 210. As the end cap pins 120 are being inserted, slanted pushing face 112 of end cap clip 110 enters the clips slot 220 and comes into contact with slanted pushing face 312 of clip section 310. As the end cap 100 and end cap pins 120 are pushed further into socket assembly 400, the slanted pushing face 112 pushes against slanted pushing face 312, causing the clip arm 320 to displace inward towards a longitudinal axis of socket assembly 400.

Figure 6:
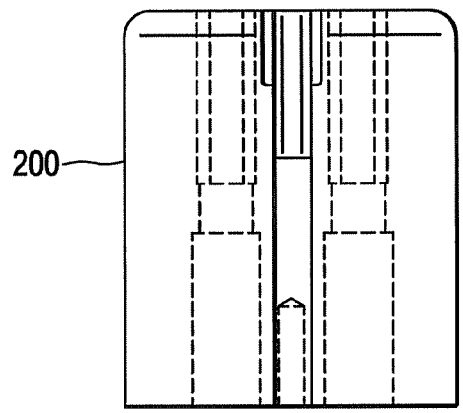
FIG. 6 is a side view of a socket body, with broken lines showing interior structure, in accordance with one embodiment of the invention.
Figure 7:
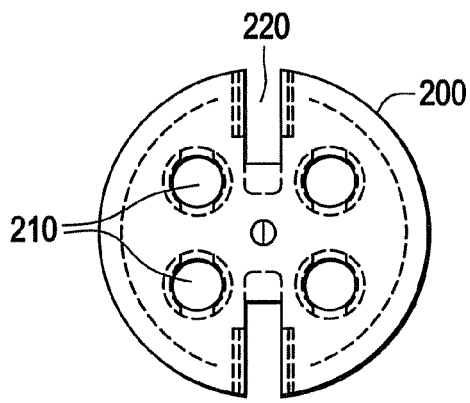
FIG. 7 is a top view of a socket body, in accordance with one embodiment of the invention.
Figure 8:
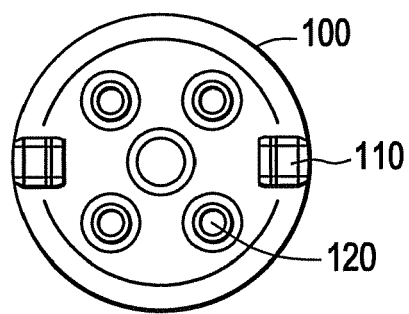
FIG. 8 is a view from the pin end of an end cap, in accordance with one embodiment of the invention.
Figure 9:
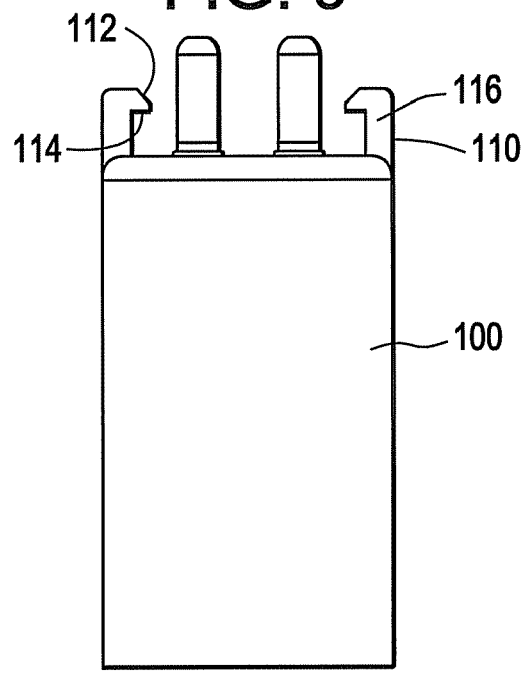
FIG. 9 is a side view of an end cap, in accordance with one embodiment of the invention.

As the clips are pushed farther in, slanted pushing face 112 will clear slanted pushing face 312. At this point, the elasticity of clip arm 320 will snap the clip section 310 back to its original position. At this point, flat locking face 114 and flat locking face 314 will be in contact with each other. The contact between flat locking face 114 and flat locking face 314 will prevent end cap 100 from being removed from socket assembly 400. FIGS. 6a and 6b illustrate one embodiment of the end cap 100 inserted into socket assembly 400.

To release end cap 100 from socket assembly 400, one would press on pressure areas 322. This would displace clip section 310 such that flat locking face 314 would no longer be in contact with flat locking face 114. With nothing to press against flat locking face 114, end cap 100 can be removed from socket assembly 400 very easily. After removing end cap 100, pressure on pressure areas 322 can be released, and clip section 310 will return to its original position.

Thus, this present snap locking operation apparatus overcomes the problems of the prior art discussed in the background at least because the lamp may be easily secured with minimal force, i.e., a "snap action" in contrast to a much more "difficult depress with more force and turn" two step motion of U.S. Pat. No. 6,334,902, or harder torque force required of U.S. Pat. No. 6,884,103, and will lock into place and remain secure even under vibration, such as vibration from water or air flowing through a disinfection apparatus to be disinfected even when hung vertically. It is also much smoother to operate than WO 2006/136026 for example and does not require to be inserted at an odd an awkward angle like WO 2006/136026. Thus, the present invention is also not merely a common sense improvement of the prior art at least because it requires many subtle features to be recognized and used in harmony, as described herein, which the prior art has not recognized to date, and has also not obviously been led to perform by common sense.

The present invention also is very safe because the electrical contacts 210 in the socket are difficult to reach with a finger, i.e., they are tucked away in a safe position from the user. Also, another safety problem with the prior art approaches is the complexity of the mechanical connection between the lamp and the base unit requiring the use of complex shaped springs, specialized connection lugs and the like. Further, a connection system that is predicated on a dual motion system such that if hard force pushing and twisting if used incorrectly for example may give rise to higher incidents of lamp breakage, electrical shock, and other damage to the lamp by field personal. Therefore, eliminating a forceful "push" necessary to deflect a heavy locking spring in a "push and twist" lock would be beneficial because the typically fragile glass lamp would then be subject to reduced force and stress. Thus, the present invention with its "snap action" is much safer and easier to use than the prior art.

FIGS. 16-31 show an alternative possible embodiment of a snap-lock connector for use with bulbs wherein the socket base 620 and the socket housing 600 or socket body may integrated into one overall piece. In this particular embodiment, a socket housing 600 has a receiving section 602 defined by receiving wall 604. This is a variation of the above embodiment and also shows an example of one way of how multiple lamps 650 or bulbs can also be implemented.

End cap 500 can be inserted into the receiving section 602, such that end cap 500 is at least partially surrounded by receiving wall 604 and so that clip notch 502 is engaged by clip 606 in a "snap-lock" manner. Other parts include:

| | |
|---|---|
| 500 | end cap, |
| 502 | clip notch |
| 510 | end cap pin |
| 520 | stepped portion |
| 600 | socket housing |
| 602 | receiving area |
| 604 | receiving wall |

-continued

| | | |
|---|---|---|
| 606 | clip | |
| 608 | clip channel | |
| 616 | exterior wiring holes | |
| 620 | socket base | |
| 650 | lamp | |
| 655 | channel | |

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A safety lamp connector apparatus for use with one or more lamps comprising:
   an end cap for the lamp, the end cap comprising:
     a hollow tubular section for receiving the lamp;
     at least one outer end cap pin; and
     at least one inner end cap terminal electrically connected to the at least one outer end cap pin;
     resilient end cap clips; and
   a socket body for receiving the end cap, the socket body comprising:
     a plurality of socket channels cut into the interior socket body;
     a plurality of interior socket contacts located in the socket channels;
     clip slots; and
   a socket base comprising:
     resilient clip arms with clip section on their ends;
   wherein the resilient end cap clips of the end cap are structured to be inserted into the socket body in the clip slots, and the resilient clip arms with clip section on their ends of the socket base are also structured to be inserted into the socket body in the clip slots such that the three parts are snapped together and electrically connected.

2. A safety lamp connector assembly for use with at least one of more lamps comprising:
   an end cap for the lamp and having end cap clips;
   an intermediate snap action socket body for receiving the end cap;
   a socket base comprising:
     resilient clip arms with clip section on their ends which snap clip to the end cap clips with the intermediate snap action socket body located between the end cap and the socket base, wherein the means for deterring a substitution of unauthorized parts comprises: a plurality of end cap pins disposed on an outer surface of the end cap and/or the socket body, the plurality of pins having a predetermined configuration; a plurality of socket channels cut into the socket body, the plurality of socket channels having a predetermined configuration complementary to the configuration of the plurality of end cap pins; wherein the end cap cannot be inserted into the socket body if the configuration of the plurality end cap pins does not match configuration of the plurality socket channels.

3. The safety lamp connector of claim 2 further comprising a means for deterring a substitution of unauthorized parts that may be unsafe.

4. The safety lamp connector of claim 1, wherein the end cap is structured to accept one or more Ultra-Violet (UV) wavelength lamps.

5. The safety lamp connector of claim 1, wherein the socket base is not a separate part but is integrated into the socket body in one piece.

6. The safety lamp connector assembly of claim 2, wherein the socket base is not a separate part but is integrated into the socket body in one piece.

* * * * *